US007962450B2

(12) United States Patent
Kruis et al.

(10) Patent No.: US 7,962,450 B2
(45) Date of Patent: *Jun. 14, 2011

(54) METHOD AND SYSTEM FOR SYNCHRONISING BOOKMARKS (75) Inventors: Dave Kruis, Kitchener (CA); Balaji Gopalan, Mississauga (CA); Barry Gilhuly, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/909,055

(22) Filed: Oct. 21, 2010

(65) Prior Publication Data
US 2011/0035790 A1 Feb. 10, 2011

Related U.S. Application Data (62) Division of application No. 11/550,854, filed on Oct. 19, 2006, now Pat. No. 7,844,576.

(51) Int. Cl.
*G06F 17/30* (2006.01)
(52) U.S. Cl. ...................................................... 707/621
(58) Field of Classification Search .................. 707/621, 707/696
See application file for complete search history.

(56) References Cited

U.S. PATENT DOCUMENTS

| | | | |
|---|---|---|---|
| 5,727,202 A | 3/1998 | Kucala | |
| 6,032,162 A | 2/2000 | Burke | |
| 6,041,360 A | 3/2000 | Himmel et al. | |
| 6,393,462 B1 | 5/2002 | Mullen-Schultz | |
| 6,671,757 B1 | 12/2003 | Cash et al. | |
| 6,694,336 B1 | 2/2004 | Multer et al. | |
| 6,708,221 B1 | 3/2004 | Mendez et al. | |
| 6,981,210 B2 | 12/2005 | Peters et al. | |
| 7,590,681 B1 | 9/2009 | Chang et al. | |
| 2001/0029527 A1 | 10/2001 | Goshen | |
| 2002/0099784 A1 | 7/2002 | Tran | |
| 2002/0103933 A1 | 8/2002 | Garon et al. | |
| 2003/0046290 A1 | 3/2003 | Yamada | |
| 2005/0015365 A1 | 1/2005 | Kavacheri et al. | |
| 2005/0131866 A1 | 6/2005 | Badros et al. | |
| 2005/0171939 A1 | 8/2005 | Fisher et al. | |

FOREIGN PATENT DOCUMENTS

| | | |
|---|---|---|
| CA | 2299035 | 2/2000 |
| CN | 1564619 | 1/2005 |
| EP | 1030247 A2 | 8/2000 |
| JP | 2003150472 | 5/2003 |
| WO | 02/059796 | 8/2002 |

OTHER PUBLICATIONS

Examination Report issued on Jun. 29, 2009 for European Patent Application No. 06122594.2.

(Continued)

*Primary Examiner* — James Trujillo
*Assistant Examiner* — Jorge A Casanova (57) ABSTRACT Systems and methods for synchronizing bookmarks between communications devices are provided. Bookmarks refer to user-defined and nicknamed URLs as local parameters in Browser software, also sometimes known as "Favorites". Real-time synchronization of bookmarks is accomplished through an application of "push technology". Upon identifying a change in the set of bookmarks of a communications device, the communications device transmits an indication of the change to the network. The network uses push technology to push the indication to the other communications device. Once the indication is received by the other communications device, the other communications device updates its set of bookmarks according to the indication thereby achieving synchronization. Synchronization may be performed between two or more devices.

21 Claims, 9 Drawing Sheets

OTHER PUBLICATIONS

Banks et al., "The ePerson Snippet Manager: a Semantic Web Application", Nov. 14, 2002, http://www.hpl.hp.com/techreports/2002/HPL-2002-328.pdf.

Isync from Apple, "Synchronizing your information is as simple as 1-2-3", http://www.apple.com/ca/isync/isyncworks.html, 2 pages, retrieved Aug. 25, 2005.

Eudora Internet Suite from Eudora, "Eudora Internet Suite 2.1 for the Palm Computing Platform", http://www.eudora.com/products/unsupported/internetsuite/index.html, 5 pages, retrieved Aug. 25, 2005.

MightyPhone from FushionOne, "Mightyphone World-Class Wireless Phone Sync", http://www.fusionone.com/products/con_phone.htm, 3 pages, retrieved Aug. 25, 2005.

SyncMLserver from Mintersoft, "syncMLserver", http://www.mintersoft.com/syncml/>, 2 pages, retrieved Aug. 28, 2005.

BlackBerry for GroupWise from Novell & RIM, "Blackberry for GroupWise: A Solution on the Go!", Novell: BrianShare 2005 (http://www.novell.com/brainshare/blackberry.html, 3 pages, retrieved Aug. 25, 2005.

PCWorld.com—BookmarkSync, "BookmarkSync", http://www.pcworld.com/downloads/file_description/0,fid,8151,00.asp, 4 pages., retrieved Aug. 29, 2005.

TrueDesk—Feature List, http://www.mintersoft.com/truedesk/features.shtml#bookmarks, blackberry web browser bookmark import, 1 page, retrieved Aug. 30, 2005.

Share Your Bookmarks Between Browsers, http://www.pcmag.com/article2/0,1759,35553,00.asp, blackberry web browser bookmark import, 7 pages, retrieved Aug. 30, 2005.

Jorstad, I. et al., "The personalization of mobile services", Wireless and Mobile Computing, Networking and Communications, IEEE International Conference on Montreal, pp. 59-65, Aug. 22, 2005.

Yu, W.D., "Work in Progress—A Mobile Computer Collaborative Framework for Problem-Based Learning Environment", Frontiers in Education, Proceedings 35th Annual Conference, pp. F4E-12, Oct. 19, 2005.

Bookmarks in the Blink of an Eye, "Bookmarks in the Blink of an Eye", http://pcworld.about.com/new/ Dec082000id36214.htm, 3 pages, retrieved Aug. 25, 2005.

Pocket Favorites—Synchronization and mobile Web launcher for Internet Explorer Favorites, "Synchronization and Mobile Launcher of Internet Explorer Favorites", http://www.chapura.com/pocket_favorites.php, 2 pages, retrieved Aug. 25, 2005.

MyPalmLife Apr. 13, 2005, "Take your IE Favorites with you", http://mypalmlife.com/index.php/archives/2005/04/13/, 5 pages, retrieved Aug. 25, 2005.

Bookmarks Go Mobile with Alliance of SyncIT.com and AvantGo, "Agreement Enables Palm OS and Pocket PC Users to Synchronize their Computer and Wireless Bookmarks", http://www.prnewswire.com/cgi-bin/stories.pl?ACCT=104&STORY=/www/story/10-17-2000/0001333..., 2 pages. retrieved Aug. 29, 2005.

SyncIT.com First to Offer AOL Compatible Free Bookmark Synchronization and Shared Access Services, "SyncIT's Flagship Service Merges Bookmarks from Multiple Computers, Makes 'Live', Edits, Identifies Dead and Duplicate Links and Ability to Publish Bookmarks for Remote Access", http://www.prnewswire.com/cgi-bin/stories.pl?ACCT=104&STORY=/www/story/09-08-1999/000101..., 2 pages retrieved Aug. 29, 2005.

Greenlight Wireless:: Skweezer, "Skweezer", http://www.greenlightwireless.net/skweezer/default.aspx, 2 pages, retrieved Aug. 25, 2005.

Sync2It—Still the best Bookmark Management Software Ever! Synchronize my favorites across multiple . . . , "BookmarkSync is a social bookmark community offering real-time automatic synchronization services that allow you to access your bookmarks and favorites from any computer or any browser, anywhere in the world. Real-time RSS feeds power your PC and mobile device", http://www.sync2it.com/, 1 page, retrieved Aug. 25, 2005.

2Go BookmarkSync—Reviews and free downloads at Download.com, "2Go BookmarkSync 1.6", http://www.download.com/2Go-BookmarkSync/3000-2370_4-10241994.html, 2 pages, retrieved Aug. 29, 2005.

[object], "News Coverage", http://www.fusionone.com/us/coverage0099.html, 12 pages, retrieved Aug. 28, 2005.

Folder A
├ bookmark 1
└ bookmark 2
Folder B
├ Folder C
│   ├ Folder D
│   │   ├ bookmark 3
│   │   └ bookmark 4
│   └ Folder E
│       ├ bookmark 5
│       └ bookmark 6
└ Folder F
    ├ bookmark 7
    ├ bookmark 8
    └ bookmark 9

METHOD AND SYSTEM FOR SYNCHRONISING BOOKMARKS

RELATED APPLICATION

This application is a divisional of previously filed U.S. application Ser. No. 11/550,854 filed Oct. 19, 2006 hereby incorporated by reference in its entirety.

FIELD OF THE APPLICATION

The application relates to communication systems, and more particularly to synchronising bookmarks.

BACKGROUND

An Internet-enabled device allows a user to browse Internet sites using an Internet browser. An Internet site is addressed by a URL (Uniform Resource Locator), which identifies and distinguishes the Internet site from all other Internet sites of the Internet. Typically, the Internet browser allows the user to save a bookmark on the Internet-enabled device when the user has found an Internet site that may be of particular interest. The bookmark identifies the Internet site's URL so that the user does not have to remember the URL. Instead, the user associates a user-defined nickname with the URL. At some later time, the user may visit the Internet site using the Internet browser by selecting the bookmark. In this manner, there is no need for the user to manually enter the URL.

Some users may have more than one Internet-enabled device for browsing Internet sites. Accordingly, such users may have more than one set of bookmarks, which may lead to inconveniences. For example, if the user wants to visit a particular Internet site on an Internet-enabled device, but the particular Internet site is bookmarked only on another Internet-enabled device, then the user cannot use the bookmark to visit the particular Internet site. Manually entering bookmarks between two Internet-enabled devices is cumbersome. Furthermore, some Internet-enabled devices browse only scaled down versions of Internet sites due to limitations in screen size, processor, or browser software. Therefore, while a particular bookmark to a non-scaled down Internet site may be useful on a first Internet-enabled device, it may not be useful on a second Internet-enabled device that displays only scaled down Internet sites.

BRIEF DESCRIPTION OF THE DRAWINGS

Embodiments will now be described with reference to the attached drawings in which.

DETAILED DESCRIPTION OF THE PREFERRED EMBODIMENTS

According to a broad aspect, there is provided a method in a communications device comprising: maintaining a set of bookmarks on an ongoing basis; receiving using push technology an indication from a network to update the set of bookmarks so as to synchronise at least a portion of the set of bookmarks with another set of bookmarks stored elsewhere; and updating the set of bookmarks according to the indication.

In some embodiments, the method further comprises: detecting that a redirection has taken place from a first site to a second site; and updating a bookmark referring to the first site so that it refers to the second site.

In some embodiments, editing the at least one existing bookmark comprises at least one of: editing a bookmark name, and editing a bookmark URL (Uniform Resource Locator); and updating the tree structure of the set of bookmarks comprises at least one of: deleting a folder, renaming a folder, moving a folder, and moving a bookmark.

In some embodiments, identifying that at least one existing bookmark has been edited comprises at least one of: identifying that a bookmark name has been edited, and identifying that a bookmark URL (Uniform Resource Locator) has been edited; and identifying that a tree structure of the set of bookmarks has been changed comprises at least one of: identifying that a folder has been deleted, identifying that a folder has been renamed, identifying that a folder has been moved, and identifying that a bookmark has been moved.

In some embodiments, the user input is via a web interface.

According to another broad aspect, there is provided a computer readable medium having computer executable instructions stored thereon for execution on a communications device so as to implement the method summarised above.

According to another broad aspect, there is provided a communications device comprising: a set of bookmarks; and a bookmark synchronisation function adapted to: a) maintain the set of bookmarks on an ongoing basis; b) receive using push technology an indication from a network to update the set of bookmarks so as to synchronise at least a portion of the set of bookmarks with another set of bookmarks stored elsewhere; and c) update the set of bookmarks according to the indication.

In some embodiments, the communications device is a wireless device, the wireless device being an always-on device and comprising: a wireless access radio adapted to communicate wirelessly with the network.

According to another broad aspect, there is provided a method in a redirector comprising: receiving a first indication from a first communications device of a plurality of communications devices, the first indication concerning bookmarks of the first communications device; determining at least one other communications device of the plurality of communications devices that is to be synchronised with the first communications device; generating a second indication indicating differences between bookmarks of the first communications device and bookmarks of the at least one other communications device, the second indication being generated based on at least the first indication; and pushing the second indication to the at least one other communications device.

In some embodiments, the method further comprises: determining whether there is a corresponding site to a site referred to by the first indication that would be more appropriate for the at least one communications device; and if it has been determined that there is a corresponding site that would be more appropriate for the at least one communications device, generating the second indication to refer to the corresponding site before pushing the second indication.

In some embodiments, the method further comprises: receiving an identification of all bookmarks and/or properties from a first communications device; determining whether the identification of all bookmarks and/or properties is to be pushed to a second communications device; and if the identification of all bookmarks and/or properties is to be pushed to the second communications device, pushing the identification of all bookmarks and/or properties to the second communications device.

In some embodiments, the permissions are determined based on user authentications.

According to another broad aspect, there is provided a computer readable medium having computer executable instructions stored thereon for execution on a redirector so as to implement the method summarised above.

According to another broad aspect, there is provided a redirector adapted to: receive a first indication from a first communications device of a plurality of communications devices, the first indication concerning bookmarks of the first communications device; determine at least one other communications device of the plurality of communications devices that is to be synchronised with the first communications device; generate a second indication indicating differences between bookmarks of the first communications device and bookmarks of the at least one other communications device, the second indication being generated based on at least the first indication; and push the second indication to the at least one other communications device.

Communication System

Figure 1:
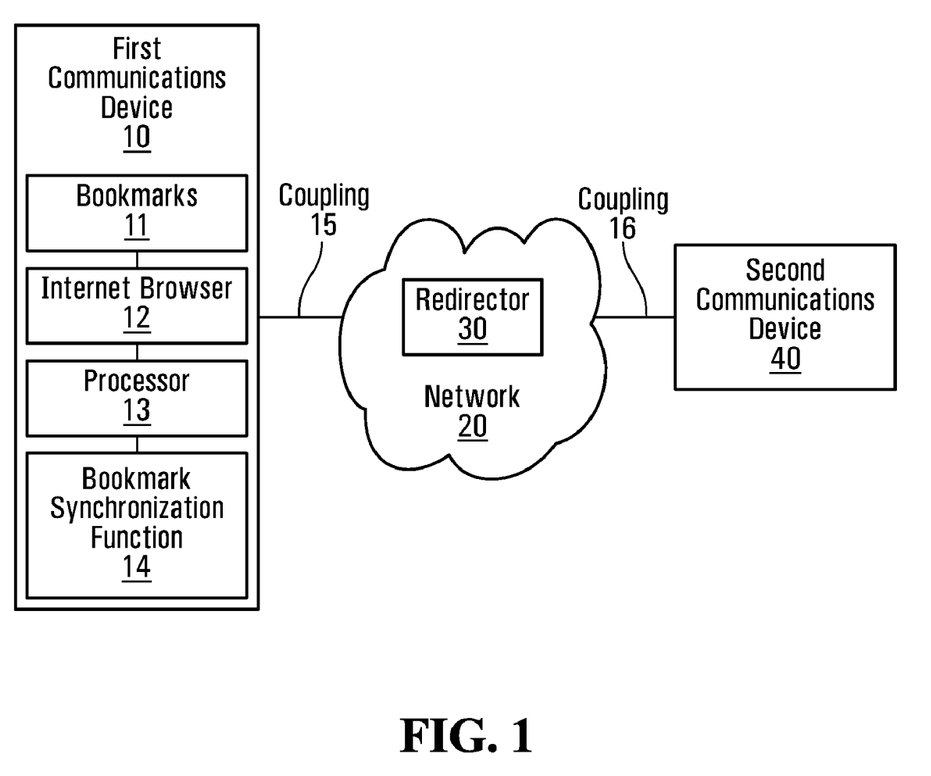
FIG. 1 is a schematic of an example communication system having communications devices and a network.

Referring now to FIG. 1, shown is a schematic of an example communication system having communications devices 10, 40 and a network 20. The communications devices 10, 40 include a first communications device 10 and a second communications device 40. There may be other communications devices, but they are not shown for sake of simplicity. The first communications device 10 has a set of bookmarks 11 coupled to an Internet browser 12, and also a bookmark synchronisation function 14. The Internet browser 12 and the bookmark synchronisation function 14 are each coupled to a processor 13. The first communications device 10 may have other components, but they are not shown for sake of simplicity. The second communications device 40 has similar components as the first communications device 10, but they are not shown for sake of simplicity. The network 20 has a redirector 30 and is coupled to the first communications device 10 through coupling 15 and to the second communications device 40 through coupling 16. The network 20 may have other components, but they are not shown for sake of simplicity. Couplings 15 and 16 are illustrated in a logical sense to be directly between the network and the communications devices. However, the "network" may include multiple networks such as a wireless access network and a wireless network. Furthermore, the nature of the network may change if one or both of the communications devices are mobile devices.

In operation, the Internet browser 12 allows a user of the first communications device 10 to browse sites of the Internet and/or a local area Intranet. The Internet browser 12 also allows the user to maintain the set of bookmarks 11 on the first communications device. The bookmark synchronization function 14 operates to synchronize at least a portion of the set of bookmarks 11 with another set of bookmarks stored elsewhere. The another set of bookmarks may be stored on another communications device, for example on the second communications device 40.

The synchronization process between the two communications devices 10, 40 may for example be triggered by a change in a set of bookmarks stored on one of the communications devices 10, 40. For example, if the set of bookmarks 11 stored on the first communications device 10 is changed, then the first communications device 10 transmits to the network 20 a first indication of the change to the set of bookmarks 11. The redirector 30 receives the first indication, generates a second indication based on the first indication, and automatically pushes the second indication to the second communications device 40 using "push technology". By contrast with polling techniques, push technology enables the second indication to be delivered to the second communications device 40 without the second communications device 40 requesting transmission of the second indication.

There may be other events triggering the synchronization process. In some implementations, user input can trigger the synchronization process. User input can be used to trigger the synchronization process if for example the two communications devices 10, 40 are being synchronized for the first time. In some implementations, each communications device 10, 40 transmits an indication of at least a subset of its set of bookmarks. In some implementations, the redirector 30 compares the entire sets of bookmarks, determines differences between them, and transmits indications to each communications device 10, 40 to update its set of bookmarks so as to achieve synchronization. Other implementations are possible.

In some implementations, synchronization may occur in either direction. For example, in some implementations changes to the bookmarks of the second communications device 40 triggers an indication to be transmitted to the first communications device 10 via the network 20 so that the set of bookmarks on the first communications device 10 can be updated. Further details of the synchronization process are provided below with reference to FIGS. 4 through 9.

In the illustrated example, the redirector 30 is shown as a single component. However, in other implementations, the redirector 30 has separate components. The components may be distributed throughout the network 20, or localised in a single location. The components may be any appropriate components suitable for combination. The redirector 30 may be implemented as hardware, software, firmware, or any appropriate combination thereof.

The Internet browser 12 and the bookmark synchronization function 14 are each implemented as software and are executed on the processor 13. However, more generally, the Internet browser 12 and the bookmark synchronization function 14 may each be implemented as hardware, software, firmware, or any appropriate combination thereof.

In the illustrated example, the components of the first communications device 10 are shown to be separate components. However, in other implementations, some components are combined. For example, in some implementations, the Internet browser 12 and the set of bookmarks 11 are combined as a single component. In other implementations, the Internet browser 12 and the bookmark synchronization function 14 are combined as a single component. Other appropriate combinations may be possible.

Communications Device

Figure 2:
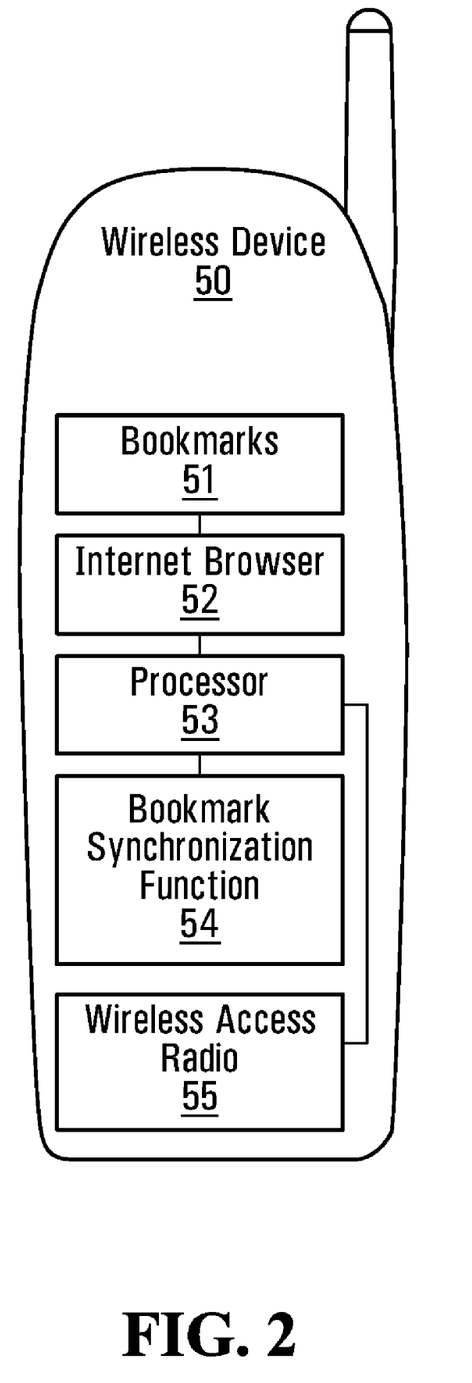
FIG. 2 is a schematic of an example wireless device.

In the illustrated example, the communications devices 10, 40 may each be any appropriate communications device, such as a desktop computer, a laptop computer, or a wireless device. Referring now to FIG. 2, shown is a schematic of an example wireless device 50. The wireless device 50 has a set of bookmarks 51 coupled to an Internet browser 52, and also has a bookmark synchronisation function 54. The Internet browser 52 and the bookmark synchronisation function 54 are each coupled to a processor 53. The wireless device 50 also has a wireless access radio 55. The wireless device 10 may have other components, but they are not shown for sake of simplicity.

In operation, the wireless device 50 operates much like the communications device 10 shown in FIG. 1, except that all communications with the network, which includes a wireless network (not shown), are done wirelessly via the wireless access radio 55. In order for the wireless device 50 to receive an indication using push technology, the wireless device 50 has a wireless connection to the wireless network. In some implementations, the wireless device 50 is an "always-on" device. An "always-on" device is a device that is not only connected to the network, but is also in a position to listen and react to events and notifications coming from other sources connected to the network or from the network itself.

It is to be noted that the wireless device 50 shown in FIG. 2 is merely for example purposes only. Variations and modifications are possible, such as those discussed above for the communications device 10 shown in FIG. 1.

Example Set of Bookmarks

Figure 3:
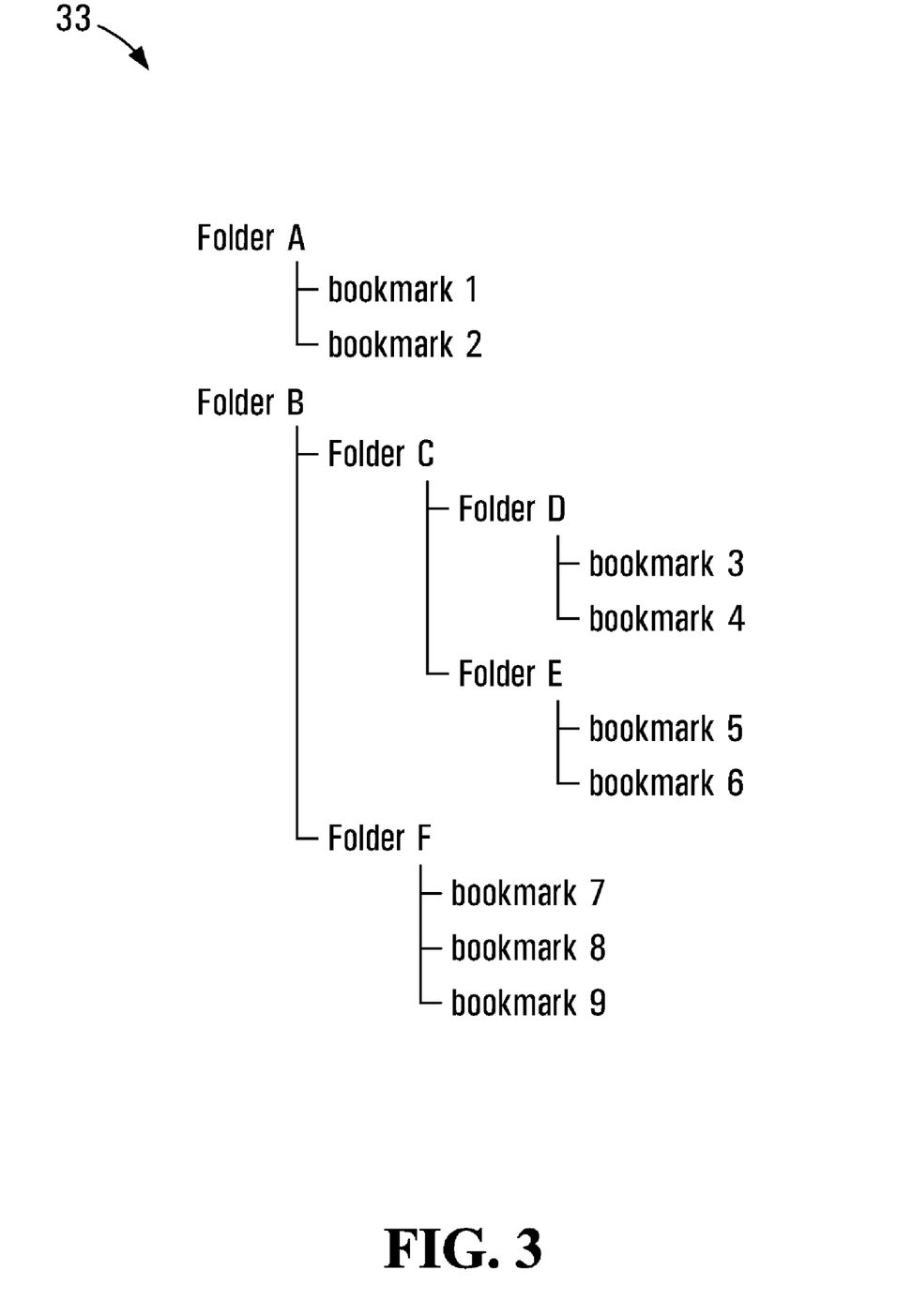
FIG. 3 is a schematic of an example tree hierarchy of a set of bookmarks.

As noted above, a communications device maintains a set of bookmarks. In some implementations, the set of bookmarks is maintained as a list. In other implementations, the set of bookmarks is maintained as a tree hierarchy of bookmarks. This allows a user to organise the bookmarks in any appropriate manner. Referring now to FIG. 3, shown is a schematic of an example tree hierarchy 33 of bookmarks. This tree hierarchy 33 of bookmarks may be maintained by a communications device, for example any of the communications devices 10, 40 shown in FIG. 1 or the communications wireless device 50 shown in FIG. 2.

The tree hierarchy 33 has two top-level folders: folder A and folder B. Folder A has two bookmarks: bookmark 1 and bookmark 2. Folder B has two sub-folders: folder C and folder F. Folder C has two sub-folders: folder D and folder E. Folder D has two bookmarks: bookmark 3 and bookmark 4. Folder E has two bookmarks: bookmark 5 and bookmark 6. Folder F has three bookmarks: bookmark 7, bookmark 8, and bookmark 9. It is to be understood that this tree hierarchy 33 is very specific for example purposes only.

Each one of the bookmarks 1 through 9 has a respective URL (not shown) and a respective display name, for example "bookmark 3". In some implementations, display names are customizable by the user. This allows the user to choose appropriate display names so that the user may better identify and differentiate between the bookmarks. The folders have respective names, for example "folder B", which may also be customised by the user for organisation proposes.

In some implementations, when the bookmarks are displayed on a wireless device, the bookmarks are displayed as a scaled-down version of the corresponding bookmarks of the desktop computer. This facilitates bookmarks to be displayed on a small display, which wireless devices typically have in comparison with a desktop computer.

Method in a Communications Device

Referring now to FIGS. 4 through 7, shown are flowcharts of an example method of synchronizing a set of bookmarks. This method may be implemented in a communications device, for example any of the communications devices 10, 40 shown in FIG. 1 or the wireless device 50 shown in FIG. 2.

Figure 4:
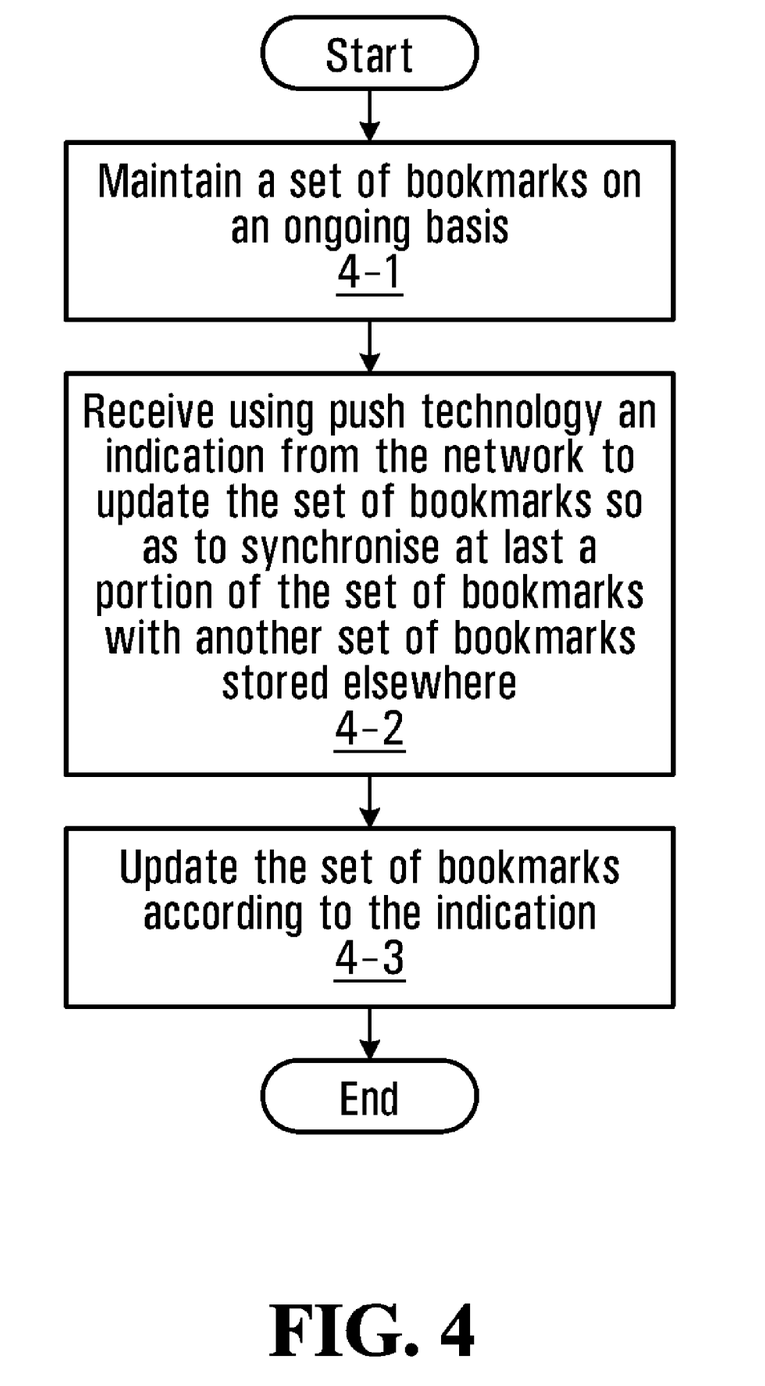
FIGS. 4 through 7 are flowcharts of an example method of synchronising a set of bookmarks.

Starting with FIG. 4, the communications device maintains a set of bookmarks on an ongoing basis at step 4-1. This may, for example, involve a user of the device adding bookmarks to the set and/or deleting bookmarks from the set. Any such changes get updated in the set of bookmarks that are being maintained. If at step 4-2 the communications device receives using push technology an indication from the network to update the set of bookmarks so as to synchronise at least a portion of the set of bookmarks with another set of bookmarks stored elsewhere, then at step 4-3 the communications device updates the set of bookmarks according to the indication.

There are many possibilities for the indication. In some implementations, the indication includes change information. Change information indicates differences between the set of bookmarks and the another set of bookmarks stored elsewhere. For example, if a particular bookmark is deleted in the another set of bookmarks, then the change information indicates only that the particular bookmark has been deleted. The indication does not include information about other existing bookmarks that have not been changed. In other implementations, the indication includes information regarding each and every bookmark in the another set of bookmarks stored elsewhere. Other implementations are possible.

Figure 5:
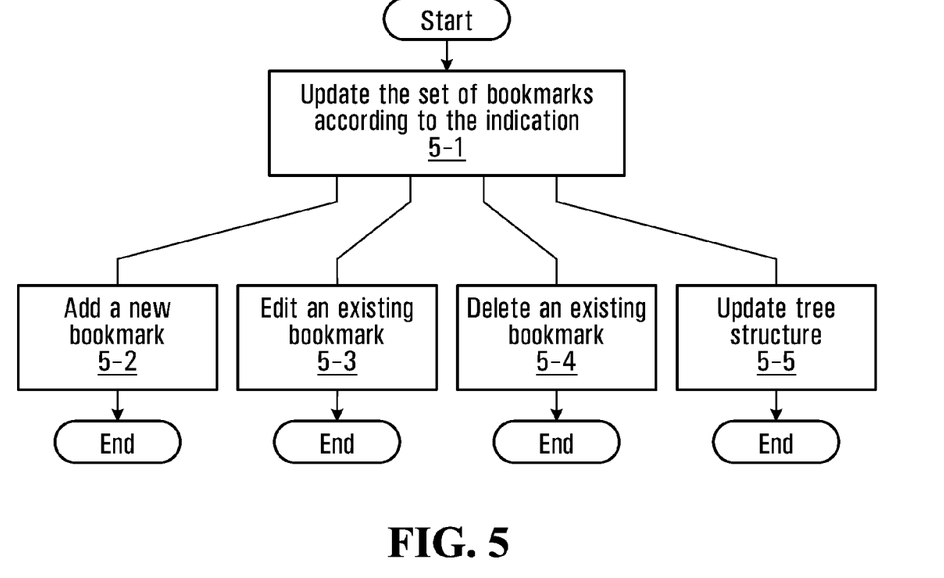

There are many ways that the communications device may update the set of bookmarks according to the indication. Referring now to FIG. 5, if at step 5-1 the communications device is to update the set of bookmarks according to the indication, then the communications device performs at least one of steps 5-2 through 5-5 depending on the indication. The communications device adds a new bookmark according to the indication at step 5-2, edits an existing bookmark according to the indication at step 5-3, deletes an existing bookmark according to the indication at step 5-4, and updates the tree structure of the set of bookmarks according to the indication at step 5-5.

There are many ways that the communications device may edit the existing bookmark. The communications device may for example edit a bookmark name, and/or edit a bookmark URL (Uniform Resource Locator).

There are many ways that the communications device may update the tree structure of the set of bookmarks. The communications device may for example delete a folder, rename a folder, move a folder, and/or move a bookmark within a folder or from one folder to another folder.

Corresponding Sites

Some sites are intended to be displayed on large displays while other sites are intended to be displayed on small displays such as those of a wireless device. Sometimes there is more than one version of the same site, each version having its own respective URL. For example, mobile.msn.com is a corresponding site to msn.com and is specifically intended for mobile browsers. Therefore, in some implementations, when the synchronisation process is between a communications device having a mobile browser and a communications device having a non-mobile browser, consideration is given as to whether or not the bookmarks are appropriate for a given communications device and/or its Internet browser. There are many ways that this can be accomplished. Examples are provided below.

In some embodiments, the communications device updates its own bookmarks when appropriate. Some sites are capable of automatically redirecting an Internet browser to a corresponding site based on the Internet browser. For example, a mobile browser visiting msn.com will be automatically redirected to mobile.msn.com. Accordingly, in some implementations, the communications device detects that its Internet browser has been redirected to a corresponding site and updates its set of bookmarks based on the redirection. For example, if the set of bookmarks contains msn.com and the communications device is redirected from msn.com to mobile.msn.com, then the communications device edits the bookmark referring to msn.com so that it instead refers to mobile.msn.com. Accordingly, the next time the user uses this bookmark, there will be no redirection. In some implementations, once bookmarks of a communications device have been updated by the synchronisation process, the communications device checks the updated bookmarks to see if redirections are prompted and updates its bookmarks accordingly. In other implementations, the communications device detects redirections and updates bookmarks accordingly only when a user visits the sites prompting redirection. Other implementations are possible.

The above examples assume that a communications device updates its bookmarks based on site redirections. In another implementation, the redirector of the network knows not to push exactly the same bookmark when synchronising if another version of the bookmark would be better suited to the recipient's Internet browser. In some implementations, when the redirector is to push a given bookmark to a communications device, the redirector determines whether there is a corresponding site to the site referred to by the given bookmark that would be more appropriate for the communications device. If there is a corresponding site that would be more appropriate, then the redirector changes the bookmark to refer to the corresponding site before pushing the bookmark. In some implementations, the redirector determines whether there is a corresponding site based on a record that is maintained by an administrator. Other implementations are possible.

The method described above with reference to FIGS. 4 and 5 relate to a situation in which a modification to the another set of bookmarks stored elsewhere is reflected in the indication received so that the communications device may update its set of bookmarks accordingly. In some implementations, a modification to the set of bookmarks of the communications device is reflected in an indication transmitted so that the another set of bookmarks stored elsewhere may be updated accordingly. An example is provided below.

Figure 6:
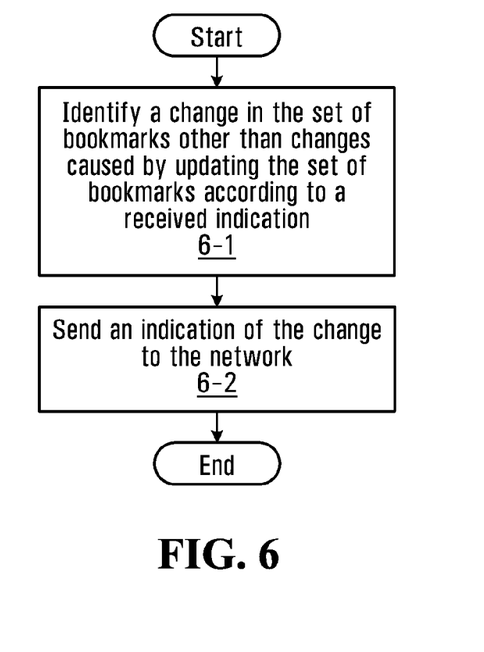

Referring now to FIG. 6, shown is an example method of sending an indication so that the another set of bookmarks stored elsewhere may be updated accordingly. If at step 6-1 the communications device identifies a change in the set of bookmarks other than changes caused by updating the set of bookmarks according to a received indication, then at step 6-2 the communications device sends an indication of the change to the network. Once the network receives the indication, then the network can push an indication of change to the appropriate recipient so as to achieve synchronisation. Changes caused by updating the set of bookmarks according to a received indication are not considered, as such changes have not originated in the communications device.

Figure 7:
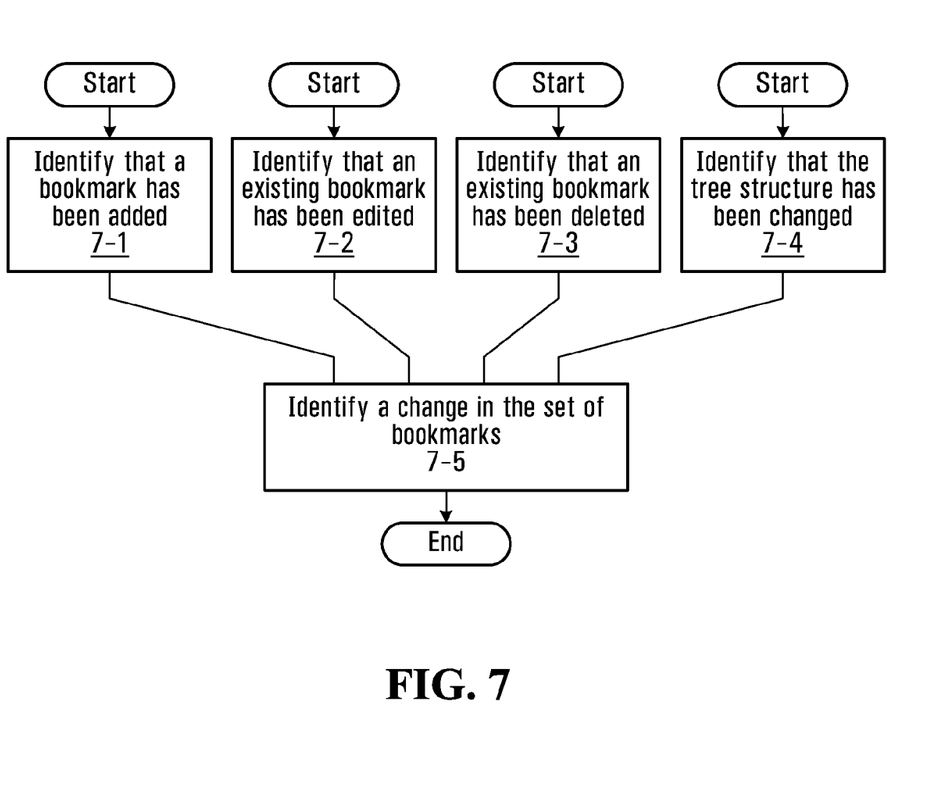

There are many possible changes to the set of bookmarks that the communications device may identify. Referring now to FIG. 7, shown are example changes that the communications device may identify. If the communications device identifies that a bookmark has been added at step 7-1, that an existing bookmark has been edited at step 7-2, that an existing bookmark has been deleted at step 7-3, or that the tree structure of the set of bookmarks has been changed at step 7-4, then at step 7-5 the communications device has identified a change in the set of bookmarks. Execution of any one or more of steps 7-1 through 7-4 means that a change in the set of bookmarks has been identified.

There are many ways that the communications device may identify that an existing bookmark has been edited. The communications device may for example identify that a bookmark name has been edited, and/or identify that a bookmark URL (uniform resource locator) has edited.

There are many ways that the communications device may identify that a tree structure has been changed. The communications device may for example identify that a folder has been deleted, identify that a folder has been renamed, identify that a folder has been moved, and/or identify that a bookmark has been moved.

In some implementations, changes to the set of bookmarks are identified automatically without user input. In some implementations, such changes are detected automatically while the Internet browser application is running or when the Internet browser application becomes online. In other implementations, the communications device accepts user input for identifying changes. The user input may be via any appropriate interface, for example a web interface. The user may identify only a portion of the changes. Accordingly, in some implementations, only a portion of the set of bookmarks is synchronised.

In the embodiment described above with reference to FIGS. 7 and 8 the communications device transmits an indication of a change of the set of bookmarks. In another embodiment the communications device transmits an indication of the entire set of bookmarks or a subset of the set of bookmarks. More generally, the communications device transmits an indication concerning the set of bookmarks. In some implementations, the communications device transmits the indication of the set of bookmarks so as to synchronize at least a portion of the set of bookmarks for the first time. In some implementations, the redirector uses the indication of the set of bookmarks to determine the differences (if any) between the set of bookmarks and the another set of bookmarks stored elsewhere. Accordingly, the redirector can push an indication of the difference(s) to the other communications device so as to achieve synchronization. Further example details of the redirector are provided below with reference to FIG. 8.

Method in a Redirector

Figure 8:
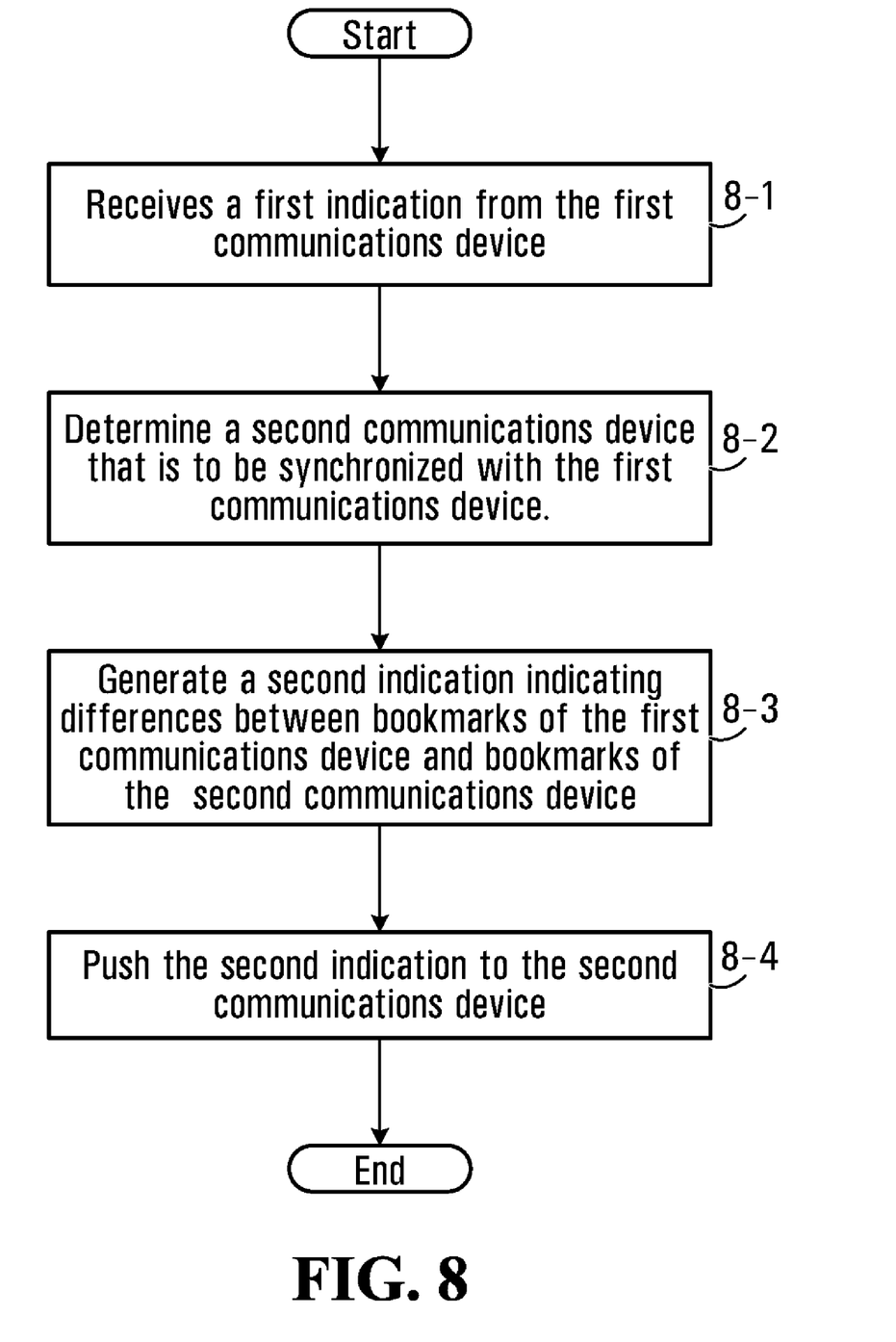
FIGS. 8 through 10 are flowcharts of example methods of pushing an indication to update a set of bookmarks.
Figure 9:
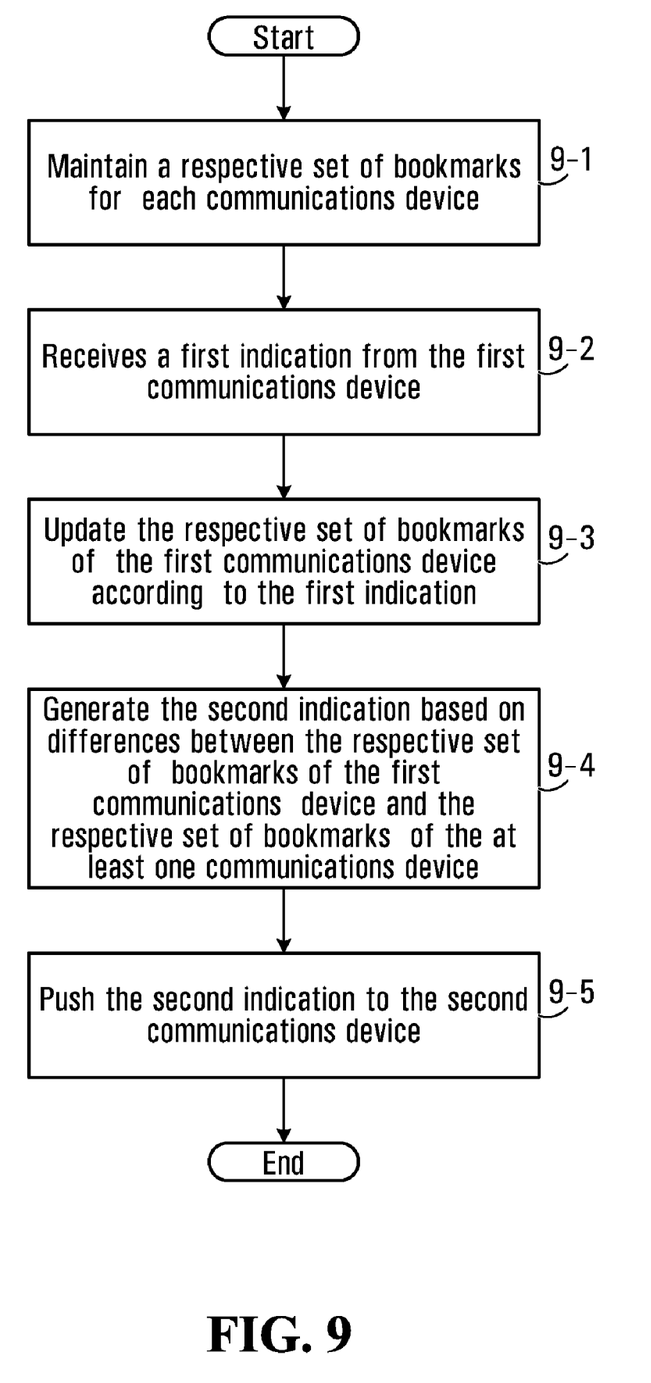
Figure 10:
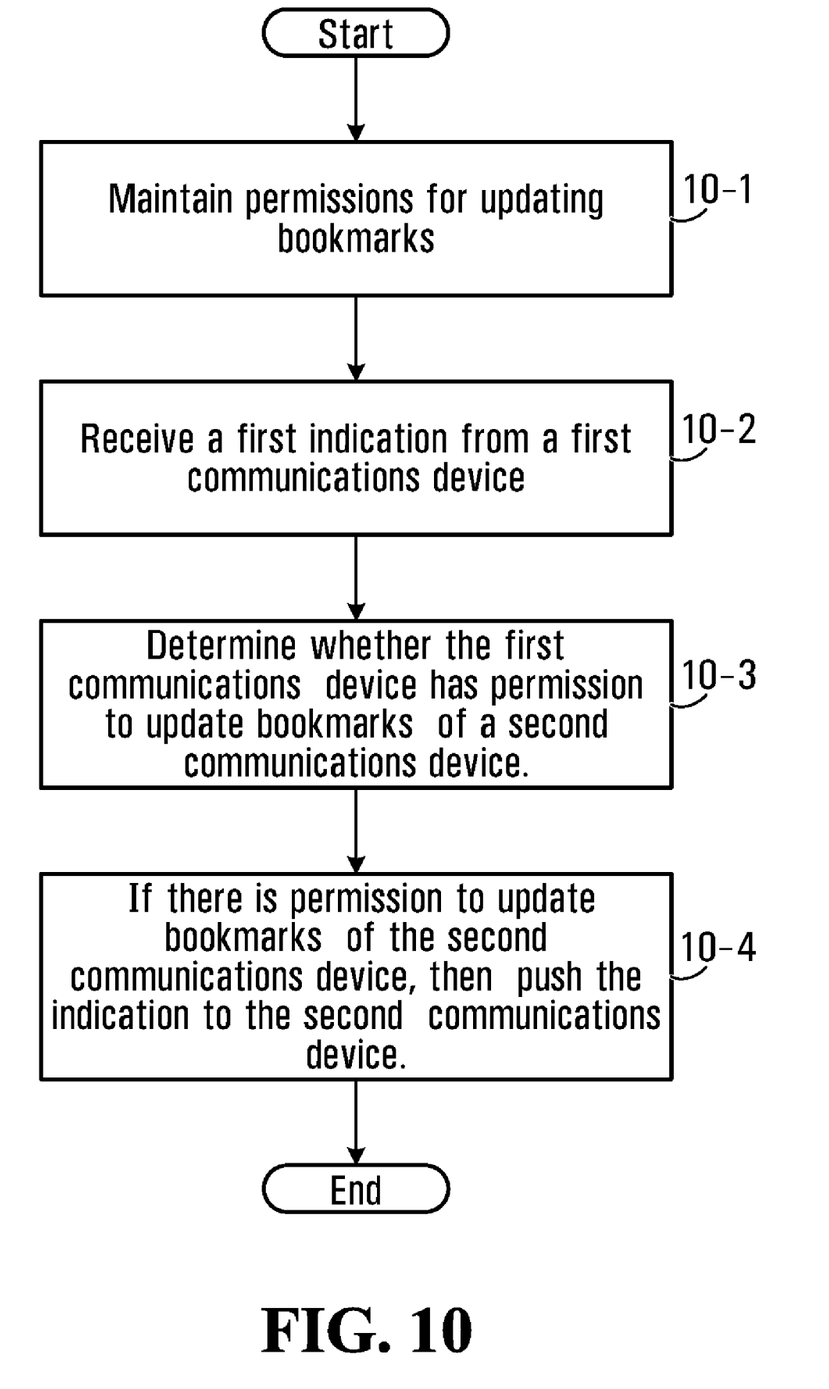

Referring now to FIGS. 8 through 10, shown are flowcharts of example methods of pushing an indication to update a set of bookmarks. These methods may be implemented by a redirector that is coupled to a first communications device and a second communications device, for example by the redirector 30 shown in FIG. 1. The redirector is an anchor point for bookmark synchronizing actions.

Referring first to FIG. 8, at step 8-1 the redirector receives a first indication from the first communications device. The first indication concerns a first set of bookmarks of the first communications device. The first indication may for example indicate a change to the first set of bookmarks, indicate the entire first set of bookmarks, or indicate a subset of the first set of bookmarks. After receiving the first indication, at step 8-2 the redirector determines a second communications device that is to be synchronized with the first communications device. At step 8-3, the redirector generates a second indication indicating differences between bookmarks of the first communications device and bookmarks of the second communications device. The redirector generates the second indication based on at least the first indication. After the second indication has been generated, at step 8-4 the redirector pushes the second indication to the second communications device.

In some implementations, if the second communications device is not reachable, then the redirector places the indication in a queue. In some implementations, upon detecting that the second communications device has become reachable, the indication is pushed to the second communications device through the network. In some implementations, the indication is pushed to the second communications device through the network only if the second communications device is currently running its Internet-browser application. Other implementations are possible.

In the illustrated example, the redirector receives a first indication from the first communications device and pushes a second indication to the second communications device. However, it is to be understood that synchronisation may occur in either direction. Accordingly, the method described above is also applicable to a situation in which the redirector receives a second indication from the second communications device and pushes a first indication to the first communications device.

There are many ways that the redirector can generate the second indication. In some implementations, the manner in which the second indication is generated is dependent upon the first indication. As noted above, the first indication may for example indicate a change to the first set of bookmarks. In some implementations, the second indication is generated so as to indicate such change. In specific implementations, the second indication is identical to the first indication. As also noted above, the first indication may for example indicate the entire first set of bookmarks, or a subset of the first set of bookmarks. In such implementations, the first indication may not indicate a change in the first set of bookmarks per se. However, the redirector nonetheless is capable of generating a second indication of changes to be applied to the second set of bookmarks of the second communications device. An example is provided below with reference to FIG. 9.

Referring now to FIG. 9, shown is a flowchart of another example method of pushing an indication to update a set of bookmarks. At step 9-1, the redirector maintains a respective set of bookmarks for each communications device. The respective set of bookmarks for a communications device is separate, but related, to the set of bookmarks maintained by the communications device. If at step 9-2 the redirector receives a first indication from the first communications device, then at step 9-3 the redirector updates the respective set of bookmarks of the first communications device according to the first indication. At step 9-4, the redirector generates the second indication based on differences between the respective set of bookmarks of the first communications device and the respective set of bookmarks of the at least one communications device. At step 9-5, the redirector pushes the second indication to the second communications device.

There are many possibilities for the second indication. In some implementations, the second indication includes change information indicating changes to be applied to the second set of bookmarks of the second communications device. In other implementations, the second indication includes a set or subset of bookmarks to be added to the second set of bookmarks of the second communications device. In other implementations, the second indication includes a complete set of bookmarks to replace the second set of bookmarks of the second communications device. Other implementations are possible.

There may be many communications devices coupled to the network. In some implementations, the redirector assumes that each communications device has permission to update bookmarks on another communications device. For example, in the illustrated example presented above, the redirector may assume that the first communications device has permission to update the second set of bookmarks of the second communications device. In other implementations, the redirector maintains an identification of permissions so that a communications device can update a set of bookmarks on another communications device only if there is permission to do so. An example is provided below with reference to FIG. 10.

Referring now to FIG. 10, shown is a flowchart of another example method of pushing an indication to update a set of bookmarks. At step 10-1 the redirector maintains permissions for updating bookmarks. If at step 10-2 the redirector receives a first indication from a first communications device, then at step 10-3 the redirector determines whether the first communications device has permission to update bookmarks of a second communications device. At step 10-4, if there is permission to update bookmarks of the second communications device, then the redirector pushes the indication to the second communications device.

In some implementations, the permissions are pre-configured. For example, a user that owns two communications devices may configure the permissions so that either of the two communications devices may update bookmarks on the other communications device. In some implementations, a user authentication is performed on a communications device to obtain permission to update bookmarks on another communications device. Other implementations are possible.

User Profiles

In the examples presented above, the communications devices each have a single set of bookmarks corresponding to a single user. In other implementations, at least some communications devices have a plurality of user profiles. Each user profile includes a respective set of bookmarks. For example, a communications device having three user profiles has three corresponding sets of bookmarks. A first user typically cannot access bookmarks from a second user of the same communications device, unless the first user has special permissions such as those assigned to an administrator.

When a user is logged on, the user is able to access their set of bookmarks. The synchronization process is applicable to their set of bookmarks, and not to bookmarks of users that are not logged on. Therefore, when the user logs off, the user is considered disconnected from the redirector. In some implementations, an indication that is to be pushed to the communications device for the user is placed in a queue. Once the user logs back on, the indication is pushed to the communications device for the user.

In some implementations, the permissions described above for synchronization are also specific to the user. For example, a first user of a communications device may have different permissions than a second user of the communications device. Other implementations are possible.

Device Replacement

In another embodiment, a first communications device can be replaced with a second communications device. According to this embodiment, all bookmarks and/or properties that previously existed on the first communications device are loaded onto the second communications device. Specifically, the first communications device uploads the bookmarks and/or properties to the network and the redirector pushes the bookmarks and/or properties to the second communications device. In some implementations, the redirector then treats the second communications device as the first communications device. In some implementations, the redirector knows to no longer send any updates to or receive any updates from the first communications device. Other implementations are possible.

Parent-Child Synchronization

The examples provided above relate to bookmark synchronization between two communications devices whereby changes to a set of bookmarks on either communications device may trigger the synchronization process. However, it is to be understood that embodiments of the application are also applicable to synchronization between two communications devices whereby only changes to a set of bookmarks on one of the communications device (i.e. the parent device)

triggers the synchronization process with the other communications device (i.e. the child device).

In some implementations, the user is provided with the option of selecting between two-way synchronization or parent-child synchronization. In some implementations, the user determines which device is the parent device and which device is the child device. In some implementations, the parent-child relationship is determined using permissions. For example, the parent device may be assigned permission to update the set of bookmarks of the child device while the child device is not assigned permission to update the set of bookmarks of the parent device. Other implementations are possible.

Bookmark Synchronization between Three or More Devices

The examples provided above relate to bookmark synchronization between two communications devices. However, it is to be understood that embodiments of the application are also applicable to synchronization between three or more communications devices. Upon identifying a change in a set of bookmarks of a communications device, the communications device transmits an indication of the change to the network. The network uses push technology to push an indication to each of the other communications devices. Each of the other communications devices updates its respective set of bookmarks upon receipt of the indication thereby achieving synchronization.

Numerous modifications and variations of the present application are possible in light of the above teachings. It is therefore to be understood that within the scope of the appended claims, the application may be practiced otherwise than as specifically described herein.

We claim:

1. A method for execution in a redirector, the method comprising:
   receiving a first indication from a first communications device of a plurality of communications devices, the first indication concerning bookmarks of the first communications device;
   determining at least one other communications device of the plurality of communications devices that is to be synchronised with the first communications device;
   generating a second indication indicating differences between bookmarks of the first communications device and bookmarks of the at least one other communications device, the second indication being generated based on at least the first indication; and
   sending the second indication to the at least one other communications device;
   wherein the method further comprises:
      determining for a first site referred to by the first indication whether there is a second site corresponding to the first site that would be better suited than the first site for a display size of the at least one other communications device; and
      if it has been determined that there is a second site that would be better suited than the first site for the display size of the at least one other communications device, generating the second indication to refer to the second site before sending the second indication.

2. The method of claim 1, wherein sending the second indication to the at least one other communications device comprises pushing the second indication to the at least one other communications device.

3. The method of claim 2, further comprising:
   maintaining permissions for updating bookmarks;
   wherein determining the at least one other communications device of the plurality of communications devices that is to be synchronised with the first communications device comprises determining which communications devices of the plurality of communications devices to which the first communications device has permission for updating bookmarks.

4. The method of claim 3, wherein the permissions are determined based on user authentications.

5. The method of claim 1, wherein:
   the first indication indicates a change of the bookmarks of the first communications device; and
   the second indication indicates the change of the bookmarks of the first communications device.

6. The method of claim 1, further comprising:
   maintaining a respective set of bookmarks for each of the plurality of communications devices;
   updating the respective set of bookmarks of the first communications device according to the first indication; and
   generating the second indication based on differences between the respective set of bookmarks of the first communications device and the respective set of bookmarks of the at least one communications device.

7. The method of claim 1, comprising:
   receiving an identification of all bookmarks and other properties from the first communications device;
   determining whether the identification of all bookmarks and other properties is to be sent to the at least one other communications device; and
   if the identification of all bookmarks and other properties is to be sent to the at least one other communications device, sending the identification of all bookmarks and other properties to the at least one other communications device.

8. A non-transitory computer readable medium having computer executable instructions stored thereon for execution on a processor of a redirector so as to implement a method comprising:
   receiving a first indication from a first communications device of a plurality of communications devices, the first indication concerning bookmarks of the first communications device;
   determining at least one other communications device of the plurality of communications devices that is to be synchronised with the first communications device;
   generating a second indication indicating differences between bookmarks of the first communications device and bookmarks of the at least one other communications device, the second indication being generated based on at least the first indication; and
   sending the second indication to the at least one other communications device;
   wherein the method further comprises:
      determining for a first site referred to by the first indication whether there is a second site corresponding to the first site that would be better suited than the first site for a display size of the at least one other communications device; and
      if it has been determined that there is a second site that would be better suited than the first site for the display size of the at least one other communications device, generating the second indication to refer to the second site before sending the second indication.

9. The non-transitory computer readable medium of claim 8, wherein sending the second indication to the at least one other communications device comprises pushing the second indication to the at least one other communications device.

10. The non-transitory computer readable medium of claim 9, wherein the method further comprises:
   maintaining permissions for updating bookmarks;
   wherein determining the at least one other communications device of the plurality of communications devices that is to be synchronised with the first communications device comprises determining which communications devices of the plurality of communications devices to which the first communications device has permission for updating bookmarks.

11. The non-transitory computer readable medium of claim 10, wherein the permissions are determined based on user authentications.

12. The non-transitory computer readable medium of claim 8, wherein:
   the first indication indicates a change of the bookmarks of the first communications device; and
   the second indication indicates the change of the bookmarks of the first communications device.

13. The non-transitory computer readable medium of claim 8, wherein the method further comprises:
   maintaining a respective set of bookmarks for each of the plurality of communications devices;
   updating the respective set of bookmarks of the first communications device according to the first indication; and
   generating the second indication based on differences between the respective set of bookmarks of the first communications device and the respective set of bookmarks of the at least one communications device.

14. The non-transitory computer readable medium of claim 8, wherein the method comprises:
   receiving an identification of all bookmarks and other properties from the first communications device;
   determining whether the identification of all bookmarks and other properties is to be sent to the at least one other communications device; and
   if the identification of all bookmarks and other properties is to be sent to the at least one other communications device, sending the identification of all bookmarks and other properties to the at least one other communications device.

15. A redirector comprising:
   a processor coupled to a memory configured for:
   receiving a first indication from a first communications device of a plurality of communications devices, the first indication concerning bookmarks of the first communications device;
   determining at least one other communications device of the plurality of communications devices that is to be synchronised with the first communications device;
   generating a second indication indicating differences between bookmarks of the first communications device and bookmarks of the at least one other communications device, the second indication being generated based on at least the first indication; and
   sending the second indication to the at least one other communications device; wherein the redirector is further configured for:
   determining for a first site referred to by the first indication whether there is a second site corresponding to the first site that would be better suited than the first site for a display size of the at least one other communications device; and
   if it has been determined that there is a second site that would be better suited than the first site for the display size of the at least one other communications device, generating the second indication to refer to the second site before sending the second indication.

16. The redirector of claim 15, wherein the redirector is configured for sending the second indication to the at least one other communications device by pushing the second indication to the at least one other communications device.

17. The redirector of claim 16, wherein the redirector is further configured for:
   maintaining permissions for updating bookmarks;
   wherein the redirector is configured for determining the at least one other communications device of the plurality of communications devices that is to be synchronised with the first communications device by determining which communications devices of the plurality of communications devices to which the first communications device has permission for updating bookmarks.

18. The redirector of claim 17, wherein the permissions are determined based on user authentications.

19. The redirector of claim 15, wherein:
   the first indication indicates a change of the bookmarks of the first communications device; and
   the second indication indicates the change of the bookmarks of the first communications device.

20. The redirector of claim 15, wherein the redirector is further configured for:
   maintaining a respective set of bookmarks for each of the plurality of communications devices;
   updating the respective set of bookmarks of the first communications device according to the first indication; and
   generating the second indication based on differences between the respective set of bookmarks of the first communications device and the respective set of bookmarks of the at least one communications device.

21. The redirector of claim 15, wherein the redirector is configured for:
   receiving an identification of all bookmarks and other properties from the first communications device;
   determining whether the identification of all bookmarks and other properties is to be sent to the at least one other communications device; and
   if the identification of all bookmarks and other properties is to be sent to the at least one other communications device, sending the identification of all bookmarks and other properties to the at least one other communications device.

* * * * *